US006899359B2

United States Patent
Presby

(12) United States Patent
(10) Patent No.: US 6,899,359 B2
(45) Date of Patent: May 31, 2005

(54) MEANS FOR COUPLING CONDUIT

(76) Inventor: David W. Presby, P.O. Box 617, Sugar Hill, NH (US) 03585

( * ) Notice: Subject to any disclaimer, the term of this patent is extended or adjusted under 35 U.S.C. 154(b) by 78 days.

(21) Appl. No.: 09/982,507

(22) Filed: Oct. 17, 2001

(65) Prior Publication Data
US 2002/0059703 A1 May 23, 2002

Related U.S. Application Data
(60) Provisional application No. 60/241,511, filed on Oct. 18, 2000.

(51) Int. Cl.[7] ............................................. F16L 25/00
(52) U.S. Cl. ...................... 285/420; 285/903; 285/236
(58) Field of Search ................................. 285/420, 903, 285/236, 373, 419

(56) References Cited

U.S. PATENT DOCUMENTS

| | | | | |
|---|---|---|---|---|
| 2,017,058 A | * | 10/1935 | Freeze ........................ 138/100 |
| 3,160,425 A | * | 12/1964 | Sinnott ........................ 285/55 |
| 3,239,254 A | * | 3/1966 | Campbell .................... 285/390 |
| 3,699,684 A | * | 10/1972 | Sixt ............................ 405/49 |
| 4,140,422 A | * | 2/1979 | Crumpler et al. ............. 405/49 |
| 4,149,740 A | * | 4/1979 | Hall ............................ 285/373 |
| 4,155,574 A | * | 5/1979 | Hulsey ........................ 285/236 |
| 4,273,367 A | * | 6/1981 | Keeney et al. ............... 285/419 |
| 4,405,161 A | * | 9/1983 | Young et al. ................. 285/80 |
| 4,440,425 A | * | 4/1984 | Pate et al. ................. 285/149.1 |
| 4,443,031 A | * | 4/1984 | Borsh et al. ................. 285/419 |
| 4,538,839 A | * | 9/1985 | Ledgerwood ................ 285/236 |
| 4,564,220 A | * | 1/1986 | Sills et al. .................. 285/236 |
| 4,795,197 A | * | 1/1989 | Kaminski et al. ............. 285/12 |
| 4,833,761 A | * | 5/1989 | Geldwerth ................... 24/616 |
| 4,871,198 A | * | 10/1989 | Hattori et al. ............... 285/373 |
| 5,058,934 A | * | 10/1991 | Brannon ...................... 285/226 |
| 5,072,972 A | * | 12/1991 | Justice ........................ 285/373 |
| 5,163,717 A | * | 11/1992 | Wise .......................... 285/236 |
| 5,335,945 A | * | 8/1994 | Meyers ....................... 285/236 |
| 5,351,996 A | * | 10/1994 | Martin ........................ 285/64 |
| 6,254,145 B1 | * | 7/2001 | Schwarz et al. ............ 285/319 |
| 6,398,270 B1 | * | 6/2002 | Fukui et al. ................. 285/373 |
| 6,581,984 B1 | * | 6/2003 | Seung-Kyu ................. 285/368 |
| 2002/0033604 A1 | * | 3/2002 | Minemyer ................... 285/373 |

FOREIGN PATENT DOCUMENTS

JP    1-316593    * 12/1989 ................. 285/420

* cited by examiner

Primary Examiner—James M. Hewitt
(74) Attorney, Agent, or Firm—George W. Dishong

(57) ABSTRACT

Couplers for coupling conduit in end-to-end flow communication relationship are disclosed. A coupler has at least two coupling members each having one end hingingly attachable to one end of another of the at least two coupling members, and one of each coupling members having one end configured with a first cooperating attaching component and the other of each having one end configured with a second cooperating attaching component. There may also be a pressure producing element which increases coupling forces when said first and second cooperating attaching components are attached. There may also be corrugations in the walls of one or all of the coupling members that fit within corrugations of corrugated conduit being connected. The inside diameter of the coupler is about equal to or greater than the outside diameter of the conduit being thereby coupled. In addition, a plurality of couplers and/or coupling members may be used to couple conduit with small diameters and conduit with large diameters. The larger the diameter of the conduit the more coupling members are needed to so couple the conduit.

23 Claims, 11 Drawing Sheets

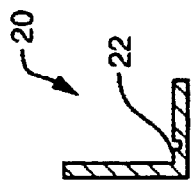
FIG. 6D
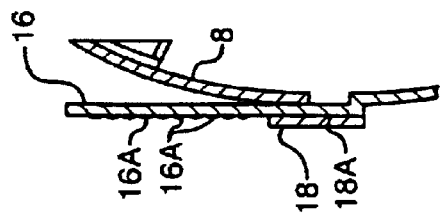
FIG. 6G
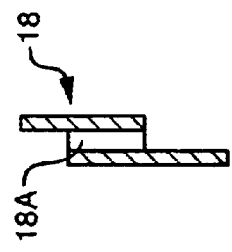
FIG. 6C
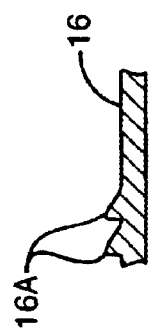
FIG. 6F
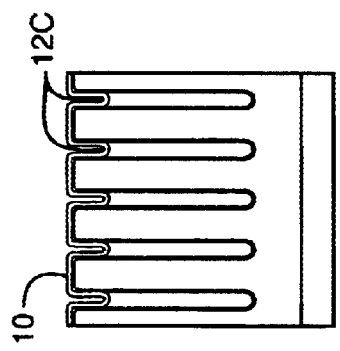
FIG. 6B
FIG. 6E

MEANS FOR COUPLING CONDUIT

This application claims the benefit, under 35 USC 119(e), of prior U.S. Provisional Application No. 60/241,511, filed Oct. 18, 2000 for Means for Coupling Conduit.

BACKGROUND AND FIELD OF THE INVENTION

The invention relates most generally with coupling devices used to couple conduit in flow communication relationship. More particularly this invention relates to a specially designed connector which is used to couple in end-to-end relationship and in flow communication relationship cylindrical conduit or pipe for use in leaching systems. Even more particularly the invention relates to a specially designed connector, coupler, or means for coupling so called corrugated cylindrical conduit which has ridges, channels and grooves over which may be laid or wrapped, either single or multiple layers of fabric. And further the invention may be used with smooth-walled pipe as opposed to corrugated types of pipe. In each instance, the pipe may be used to effectively process effluent in a leaching system.

DESCRIPTION OF THE PRIOR ART

There are many devices used in connecting pipe/conduit. In most instances the devices are not designed for ease of use, safety, or reuse, nor are they economic or simple for providing a coupling only sufficient to maintain relationship of the conduit being coupled without the need to have pressure fluid tight connection.

It would be advantageous to have a coupler especially for coupling corrugated pipe which emphasizes or addresses the relatively simple need for joining or coupling conduit without the concern for having no leaks under pressure.

There is nothing currently available which satisfies these needs and objectives. However, the invention disclosed herein does meet all of these objectives. No prior art of which Applicant is aware is as effective and as efficient as the instant coupler system. Clearly the instant invention provides many advantages over the prior art known by Applicant. Again it is noted that none of the prior art meets the objects of the coupler as used in septic and waste water treatment in a manner like that of the instant invention. None of them is as effective or as efficient.

It is also important to note that the use of the couplers of the present invention permit the easy coupling and decoupling of conduit and more particularly the coupling and decoupling of corrugated plastic septic pipe used in septic systems. The couplers may be used with standard forms of corrugated pipe and with special designs of perforated and corrugated pipe which may or may not be fabric wrapped such that liquids will be diffused/dispersed without channeling the liquids in a forced direction, thereby adding considerably to the life of any septic system. These couplers may also be used on corrugated or smooth-walled structures or any fluid-carrying structure that passes fluids through itself or through holes, slots, or cuts over, under, through or around.

SUMMARY OF THE INVENTION

In the most fundamental aspect of the present invention, there is provided a coupler device which will quickly, effectively, simply, safely and economically connect adjacent ends of two pieces of conduit in fluid flow communication. The preferred coupler consists of two coupling members which may or may not be joined at one end in such a manner as to allow bending of coupling members relative to each other. The other end of each of the coupling members is configured so that the ends are securely engageable. The coupler, if wrapped around the adjacent ends of two end-to-end facing conduit and the ends of the coupler are securely engaged, will retain/maintain the end-to-end relationship of the two pieces of conduit. There may also be corrugations in the walls of one or both of the coupling members which corrugations fit within and mate, or interfit, with at least one of the corrugations of corrugated conduit if corrugated conduit is being connected. The inside diameter of the coupler is about equal to or slightly greater than the outside diameter of the conduit being thereby coupled. The coupler for coupling corrugated conduit is substantially functional to maintain the connection of the coupled conduit but not necessarily in a fluid-tight relationship. However, when considering gravity driven fluid flow, substantially most of all of the fluid will flow between and through each of the coupled conduit, and the connection will be essentially fluid-tight. For large diameter pipe, the manner of coupling may be made up of a plurality of coupling members or a plurality of couplers configured to fit each to the other in sufficient numbers to completely wrap around the outer surface of the conduit being coupled.

The preferred form of the cooperating attaching components of the coupling members is similar in structure to that of "wire ties". However, it is not necessary, and in many instances not desirable, to provide an attachment which is substantially unattachable. In many instances it is desireable to be able to decouple coupled conduit and to be able to reuse the coupler.

Thus it is an advantage of the invention to provide a quick, effective, simple, safe and economical coupler to connect adjacent ends of two pieces of conduit in fluid flow communication.

It is another advantage of the invention to provide a coupler that can be permanently attached to conduit.

It is a further advantage of the invention to provide a coupler that is detachable such that the coupler and/or the conduit may be reused.

It is yet another advantage of the invention to provide a coupler that can be easily used with conduit of various diameter by having one or more coupling members such that one coupler may be used alone, or as many couplers as necessary may by configured together to completely wrap around the outer surface of large(r) diameter conduit.

These and further objects of the present invention will become apparent to those skilled in the art to which this invention pertains and after a study of the present disclosure of the invention.

BRIEF DESCRIPTION OF THE DRAWINGS

FIGS. 6C, 6D, 6E and 6F show various detail indicated in FIG. 5A;

FIG. 6B shows an enlarged section view of a portion of conduit with the coupler attached;

FIG. 6G is an enlarged view of the coupling mechanism coupled around a conduit;

DESCRIPTION OF THE PREFERRED EMBODIMENTS

Figure 1:
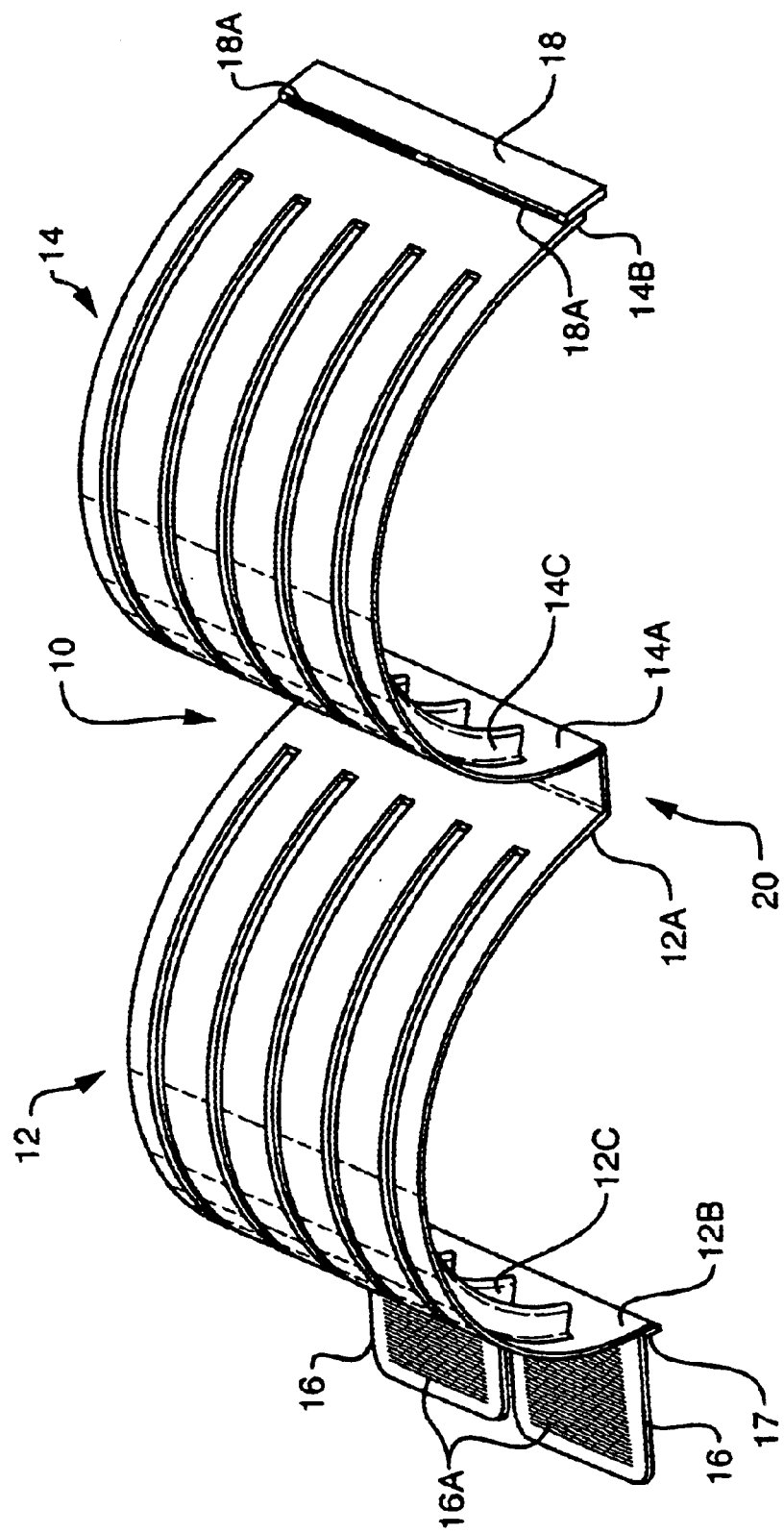
FIG. 1 is an isometric view of the invention showing the coupler in the unwrapped condition.
Figure 2:
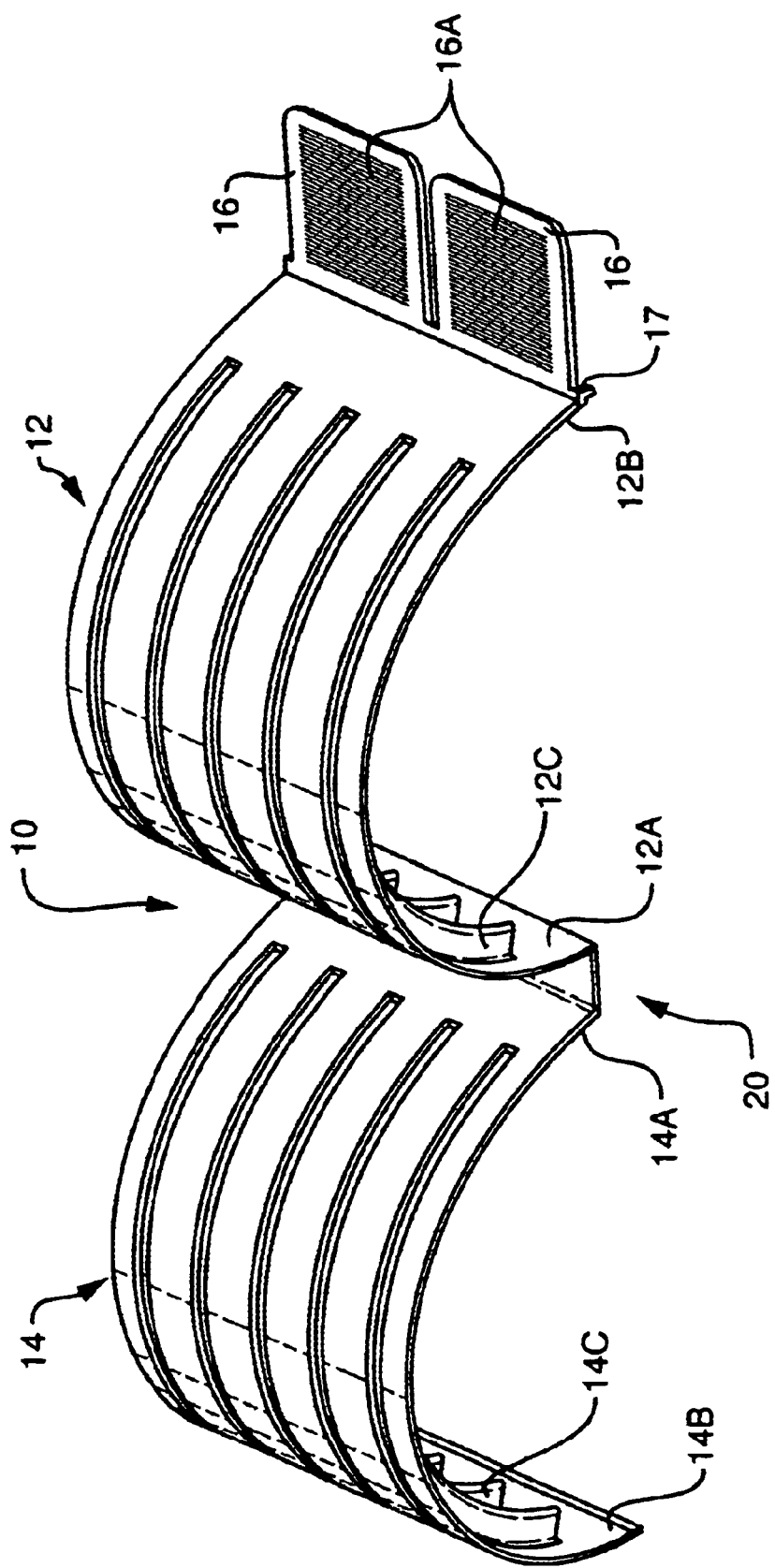
FIG. 2. is another isometric view of the invention showing the coupler in the unwrapped condition.
Figure 3:
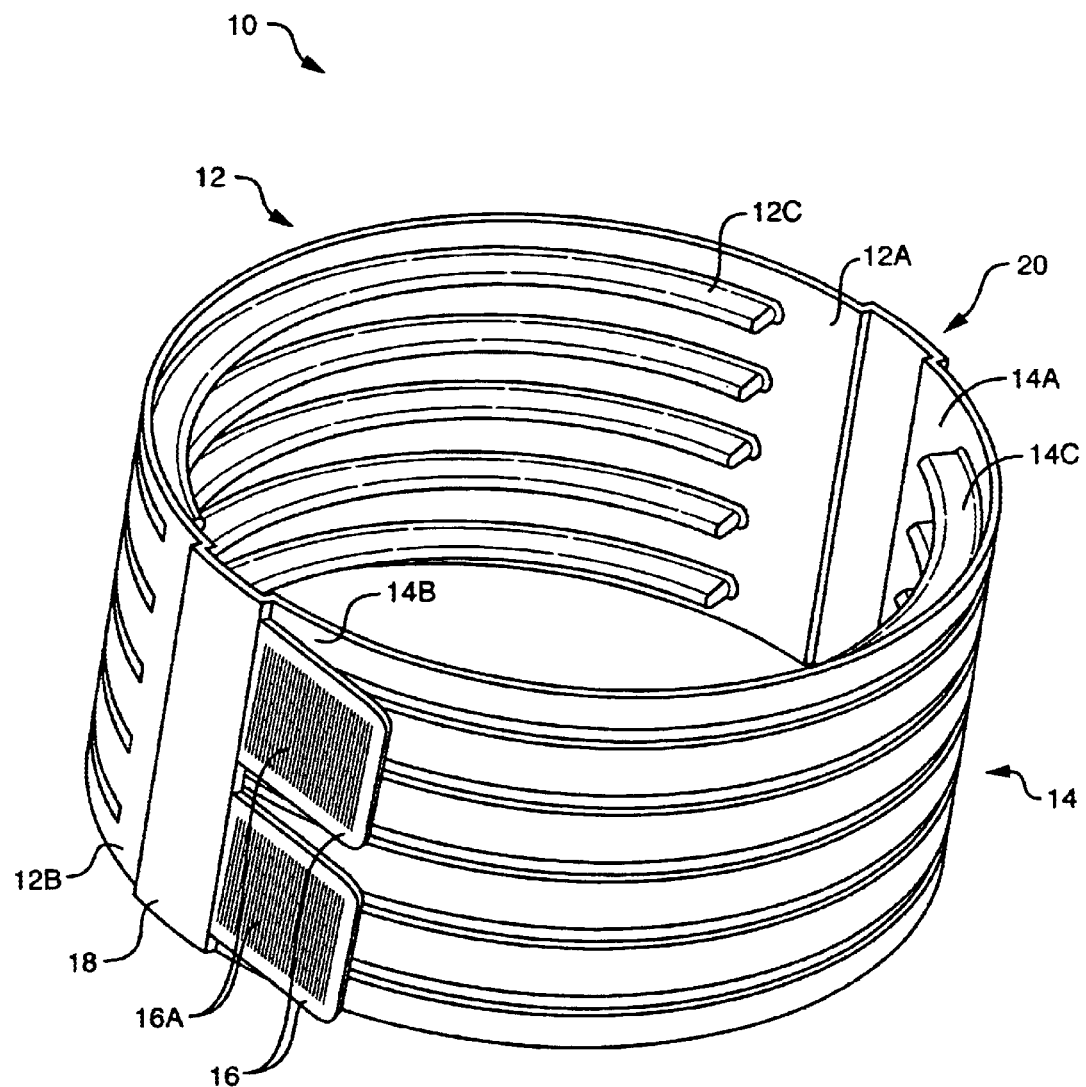
FIG. 3. is an isometric view of the invention showing the coupler in the wrapped condition.
Figure 4:
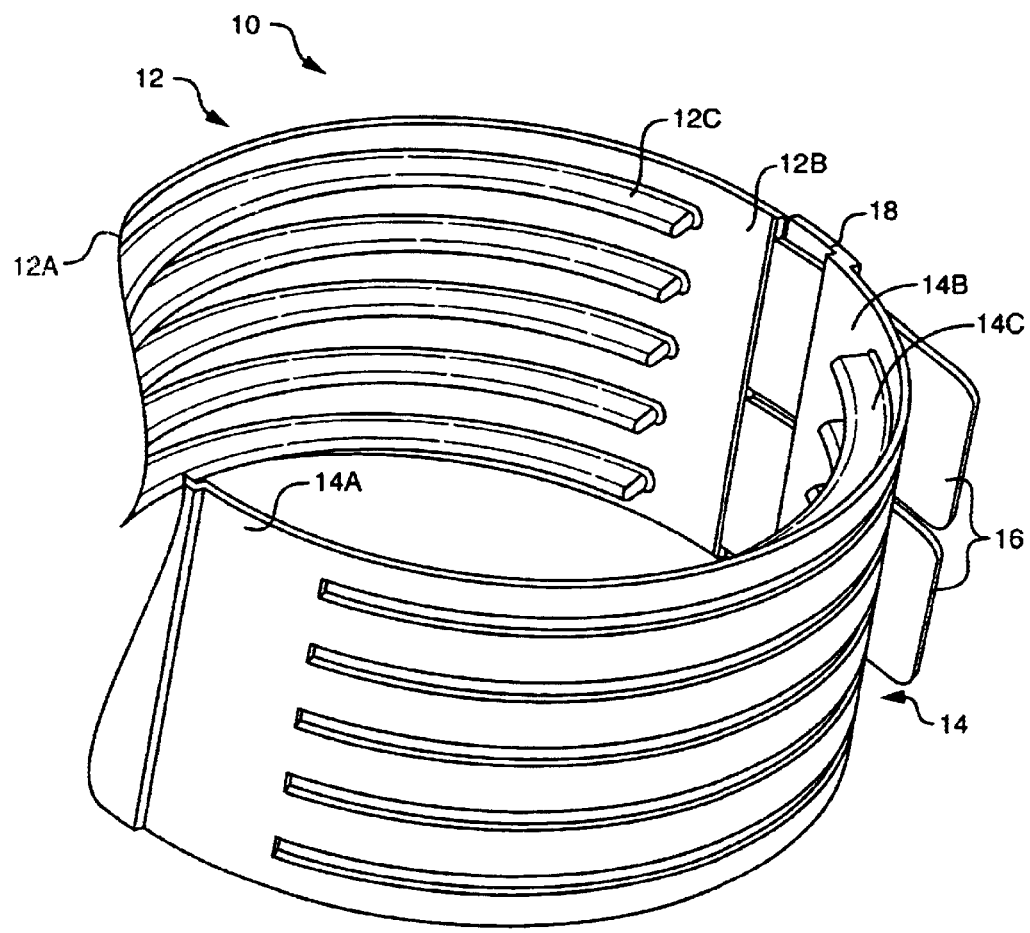
FIG. 4 is another isometric view of the invention showing the coupler in the wrapped condition.

The following is a description of the preferred embodiment of the invention. It is clear that there may be variations in the size and the shape of the coupler, in the materials used in the construction and in the orientation of the various parts and the means for connection. However, the main features are consistent and the particular objectives, features and advantages are as noted.

In one embodiment of the invention, the detail of which is provided in drawing FIGS. 1–7A, coupler 10 for coupling conduit 8 in end-to-end flow communication relationship has two arcuate coupling members; the first coupling member 12 having one inner end 12a hingingly attached, or attachable, to one inner end 14a of the second coupling member 14 of the two coupling members. The first member 12 has the outer, or opposite, end 12b configured with at least one first cooperating attaching component 16 and the second coupling member 14 has the outer, or opposite, end 14b configured with at least one second cooperating attaching component 18. There may also be a pressure producing element (not shown) so as an "o-ring" type device or structure that increases coupling forces when the first and second cooperating attaching components 16, 18 are attached.

There may also be corrugations 12C and/or 14C in the walls of one or both of the coupling members 12 and 14 which corrugations fit within and mate or interfit with at least one of the corrugations of corrugated conduit if corrugated conduit is being connected.

In addition, although also not shown but easily understood by one of ordinary skill in the art without the need for specific illustration, there may be perforations in the coupler 10. The perforations could be located in the wall of the coupling members 12, 14 and/or in the corrugations 12C/14C if the coupler 10 is corrugated. The perforations would be located, sized and spaced to mate, interfit, or align with perforations in perforated conduit or pipe if the coupler were being used with perforated conduit in a septic, wastewater, or irrigation type application. Thus the perforations would assure that there would not be an area that is un-perforated where two pieces of conduit are joined, and would thereby assure that the coupler would not disrupt passage of fluid into or out of the conduit through the walls of the conduit.

The inside diameter of the coupler 10, when closed, is about equal to or slightly greater than the outside diameter of the conduit 8 being thereby coupled. The coupler 10 for coupling conduit is substantially functional to maintain the connection of the coupled conduit 8, but not necessarily in a fluid-tight relationship. However, when considering gravity driven fluid flow, substantially most of all of the fluid will flow within and between each of the coupled conduit sections, thereby resulting in an essentially fluid-tight connection. However, the coupler 10 may be made to be more fluid-tight by including a elastic material, (again not shown but easily understood), located on the interior surface of coupling members 12, 14 which, when the coupler 10 is closed around the conduit 8, is compressed against the outer surface of the each of the conduit or pipe sections being connected or coupled. Such an elastic material could be one or more "o-ring" type structures (as would be known in the art for seal enhancing) used at the ends of the coupler 10, or could be a thin elastic material coating on the entire inner surface of coupling members 12, 14. In addition, there are clearly other ways to enhance the fluid-tight nature of the coupling if desired.

Figure 6:
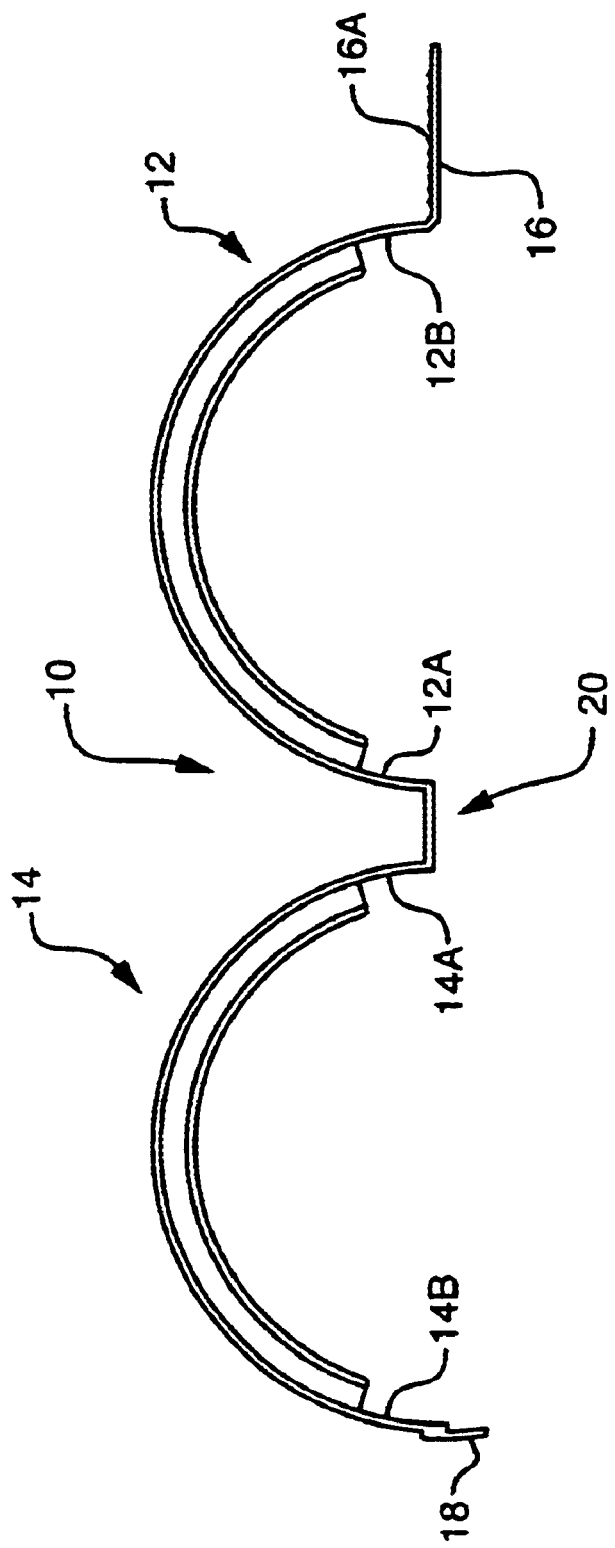
FIG. 6 is a side plan view of the coupler showing the arcuate nature of each of the coupling members, the hinging structure and the attaching components.
Figure 7:
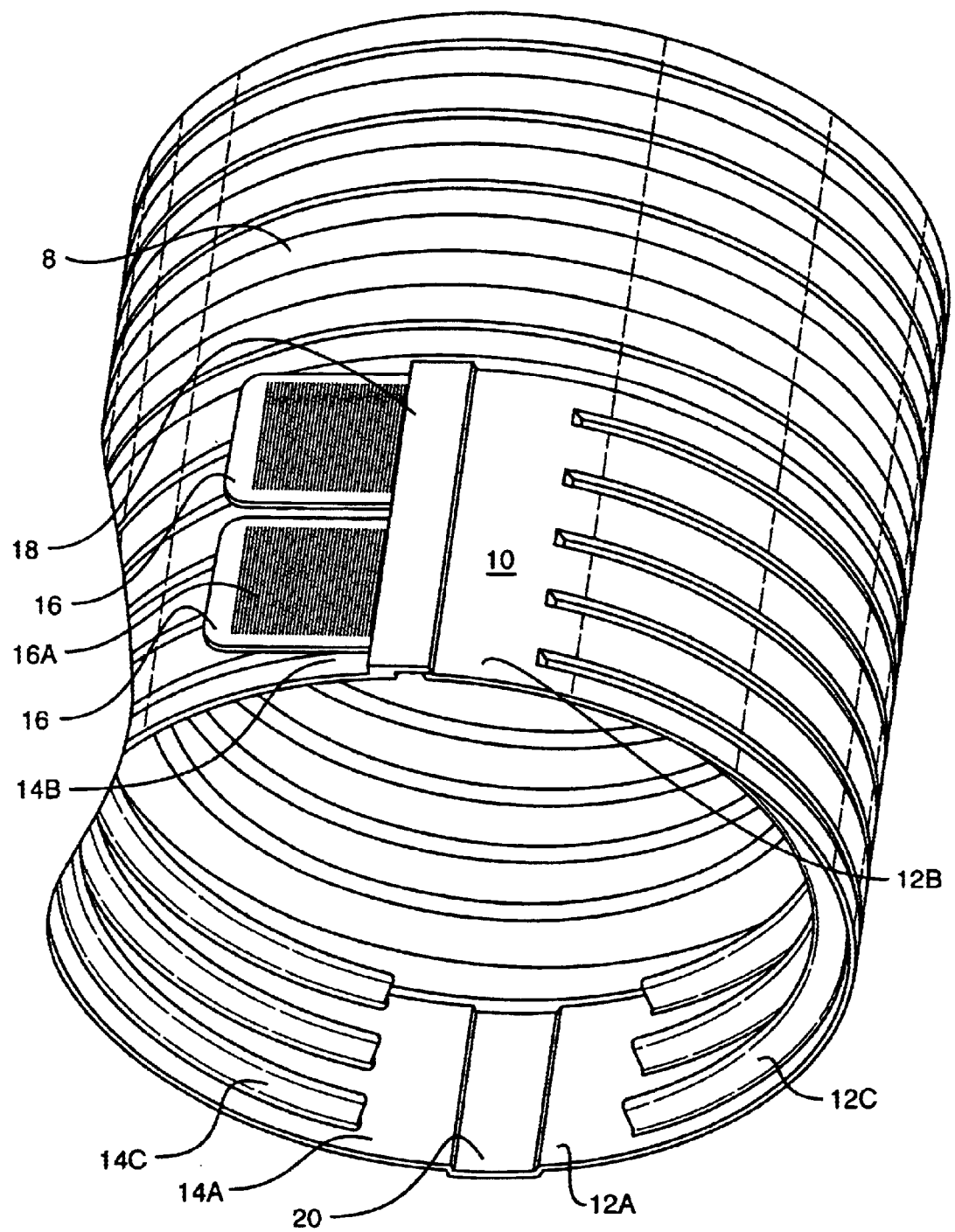
FIG. 7 is an isometric view of the invention showing the coupler in the wrapped condition around one piece of corrugated conduit.
Figure 7A:
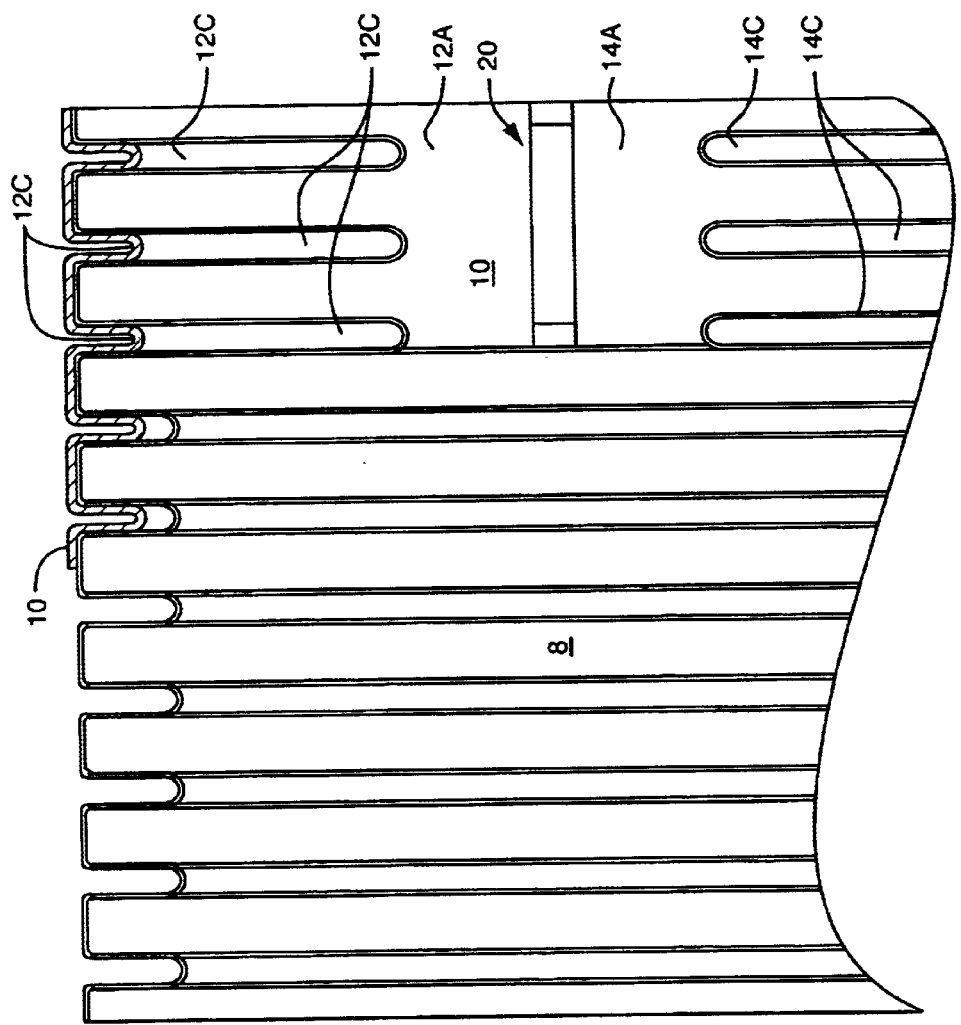
FIG. 7A is a section view of the invention showing the coupler in the wrapped condition around one piece of corrugated conduit.

For illustration of the first embodiment of the coupler 10 coupled around one section of conduit 8 (shown with only one section of conduit so the coupling may be seen), see in particular FIGS. 6G, 7 and 7A. In these Figures, one coupler 10, and its two coupling members 12 and 14, extends or wraps completely around the conduit 8 being connected, and is then sealed or closed by insertion of first cooperating attaching component 16 into second cooperating attaching component 18.

Referring again to the preferred first embodiment, in greater detail; the first and second cooperating attaching components 16 comprise at least one insertion element or tab as the first attaching component and at least one receiving element as the second attaching component 18. Insertion element(s) 16 is located at the outer end 12b of coupling member 12. Receiving element(s) 18 is located at the outer end 14b of coupling member 14. Each of the insertion elements or tabs 16 is insertable into the cooperating receiving element 18. Each of the insertion elements 16 has a plurality of either dents, detents, scorings, or ridges 16a which slidingly interfit with either dents, detents, scorings, or ridges 18a within the receiving element 18. When the insertion element 16 is slid into or inserted into the receiving element 18, there is a substantial connection created which may or may not be disconnected depending upon the geometry of the cooperating dents, detents, scorings and ridges 16a and 18a. Greater detail of the dents, detents, scorings or ridges 16a can be seen in FIG. 6F. Greater detail of receiving element 18 can be seen in FIG. 6C.

Thus, the preferred means for forming the attachment of the ends of the coupler 10 around the conduit 8 is somewhat similar to the "wire tie" in which attachment is easy as one end is slid into a slot in the other end, but detachment may be difficult or impossible due to the ridges on the tie. With the present invention attachment is either irreversible or reversible depending on the geometry and arrangement of the cooperating dents, detents, scorings, and ridges 16a, 18a.

Figure 5:
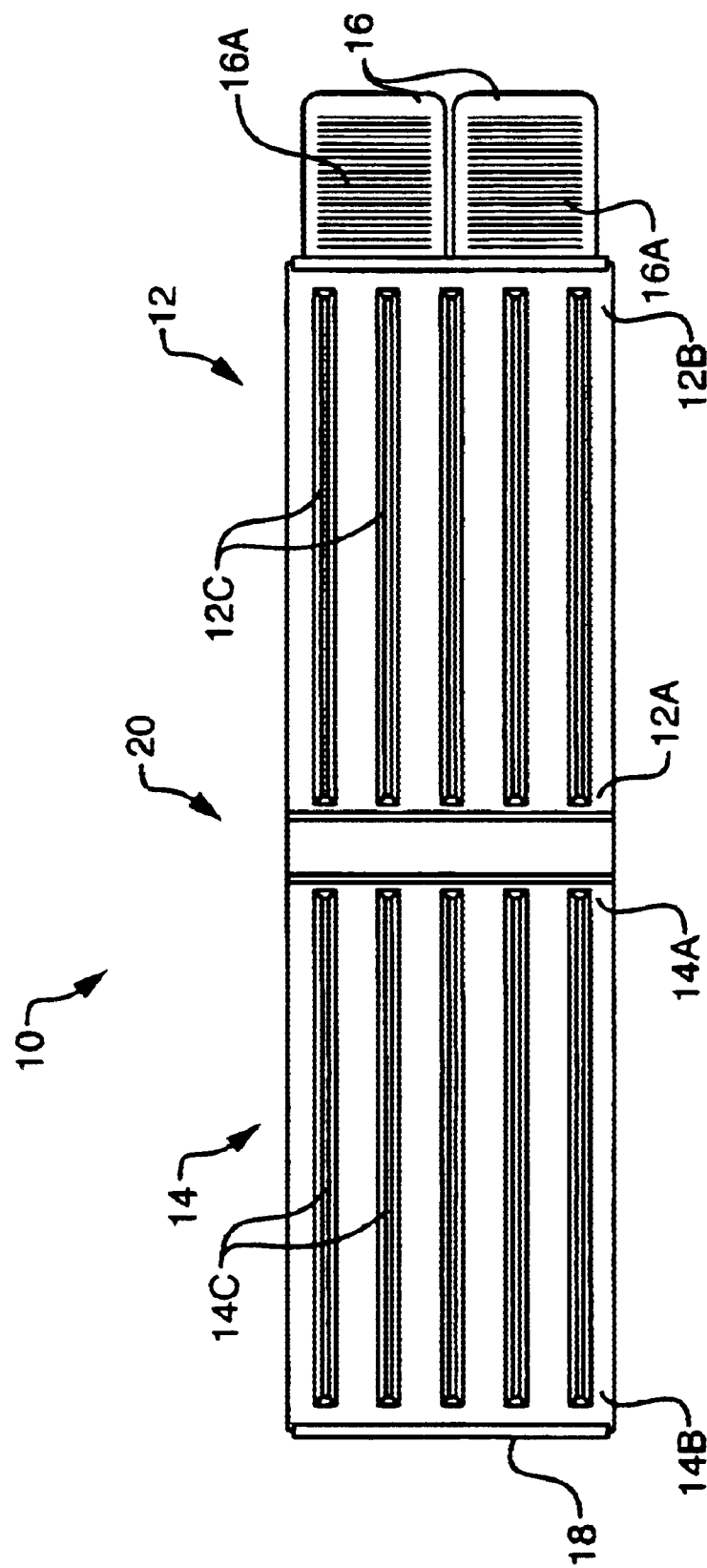
FIG. 5 is a top plan view of the coupler showing the outer surface and the cooperating attaching components.
Figure 5A:
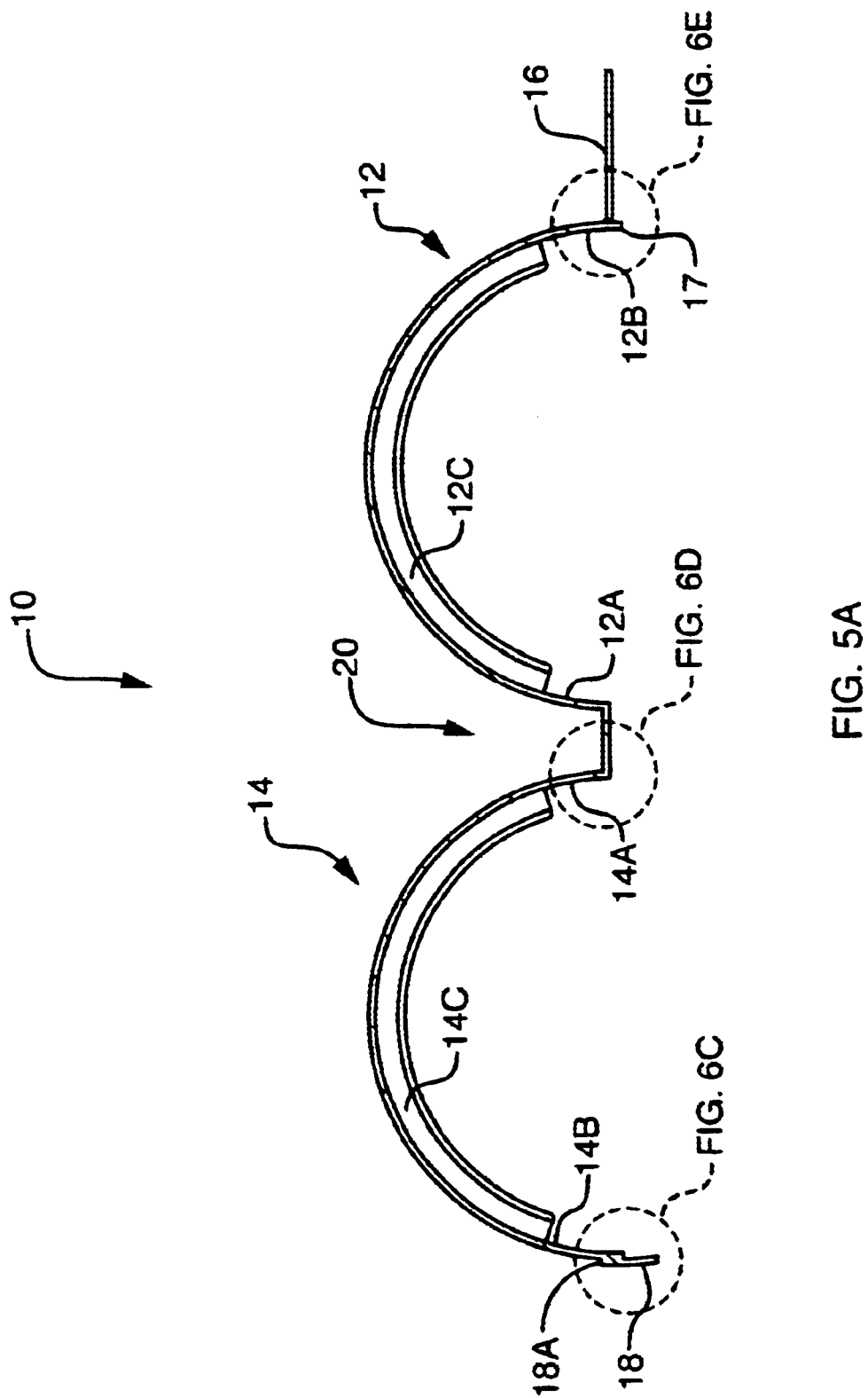
FIG. 5A is a section view illustrating the ridges of the first attaching component and the cavity or slot of the second attaching component as well as the hinge geometry.

There may also be a means 17 for limiting, or regulating, the degree of bend of the insertion component 16 located at the position where the first attaching component (or insertion element) 16 is contiguous with the first, or outer, end 12b of the coupling member 12. This means 17 for limiting or regulating the bend may be a bump or a ridge which contacts a stopping surface when the first cooperating attaching component 16 is bent past alignment with a tangent to the first, or outer, end 12b the coupling member 12. Greater detail of means 17 for limiting or regulating the degree of bend of the insertion component 16 can be seen in FIGS. 5A and 6E.

At inner ends 12a and 14a is the hinge region 20. This hinge region 20 can be seen in FIGS. 1–3, FIGS. 5, 6 and 5A, and in greater detail in FIG. 6D. FIG. 6D illustrates how hinge region 20 may also include a means 22 for limiting or regulating the degree of bend of the hinge region 20 where coupling members or components 12 and 14 meet. As can be seen, this means 22 for limiting or regulating the bend may be a bump, ridge or dip in the material of the hinge region.

Finally, FIGS. 6B, 6G, 7 and 7A illustrate the coupler 10 in position around one end of one conduit 8. FIG. 7 shows the closed coupler wherein first cooperating attaching component(s) 16 has been inserted into receiving element(s) 18. While only one piece of conduit 8 is shown for example purposes to see the coupling, two pieces of conduit 8 would be positioned end to end before the coupler 10 would be placed around the conduit and secured by inserting element(s) 16 into receiving element(s) 18.

FIGS. 6G and 7A are alternative views showing the coupler closed around a piece of conduit. FIG. 6G shows the cooperating dents, detents, scorings or ridges 16a and 18a. In FIG. 7A is illustrated how the corrugations 12c of the coupler 10 interfit with corrugations of the conduit 8. Again, however, neither the coupler nor the conduit to be connected need be corrugated.

Finally, once the conduit has been coupled, the entire structure may be covered, (not shown), with a fabric covering if the conduit 8 and/or coupler 10 is perforated and is being used in an irrigation, wastewater or septic application.

A second embodiment of the invention is a coupler having substantially the same function and purpose as that of the coupler of the first embodiment, but wherein the two coupling members 12 and 14, when hinged and positioned to connect two conduits, do not extend or wrap completely around the conduit because of the dimension of the circumference of the conduit being coupled. With larger such diameter conduit, coupling may be accomplished by connecting a plurality of individual coupling members 12 or 14, (or a plurality of couplers 10), to each other in sufficient numbers to extend or wrap around such larger diameter conduit.

The dimensions of the coupling members 12,14 is such that there is required an even integer multiple (greater than two (2)) of coupling members 12,14 in order to fully wrap and connect the conduit. For example, where each of the coupling members is dimensioned to wrap about 180 degrees around the conduit, one coupler 10 would be required which is according to the description of the first embodiment. Where the conduit is larger in diameter, each of the coupling members 12, 14 may be dimensioned to wrap about 90 degrees around the conduit, thereby needing two couplers 10 or four (4) coupling members 12,14 with each of the coupling members having an inner surface with an arc length based upon about 90 degrees. Even larger conduit can be coupled where each of the coupling members 12,14 wraps 45 degrees around the conduit. In this instance four couplers 10 would be needed or eight coupling members 12,14.

As in the first embodiment, with this second embodiment, or way of using the coupler(s) 10, there may also be corrugations in the walls of one or both of the coupling members 12,14 which corrugations fit within and mate or interfit with at least one of the corrugations of corrugated conduit if corrugated conduit is being connected. With this second embodiment, as with the first embodiment, the inside diameter of the coupler 10 is about equal to or slightly greater than the outside diameter of the conduit being thereby coupled. There may also be perforations located in the wall of coupling members 12, 14 of this embodiment if perforated conduit is being connected, as well as perforations located in the corrugations in coupling members 12,14 if corrugated perforated conduit is being connected.

Figure 8:
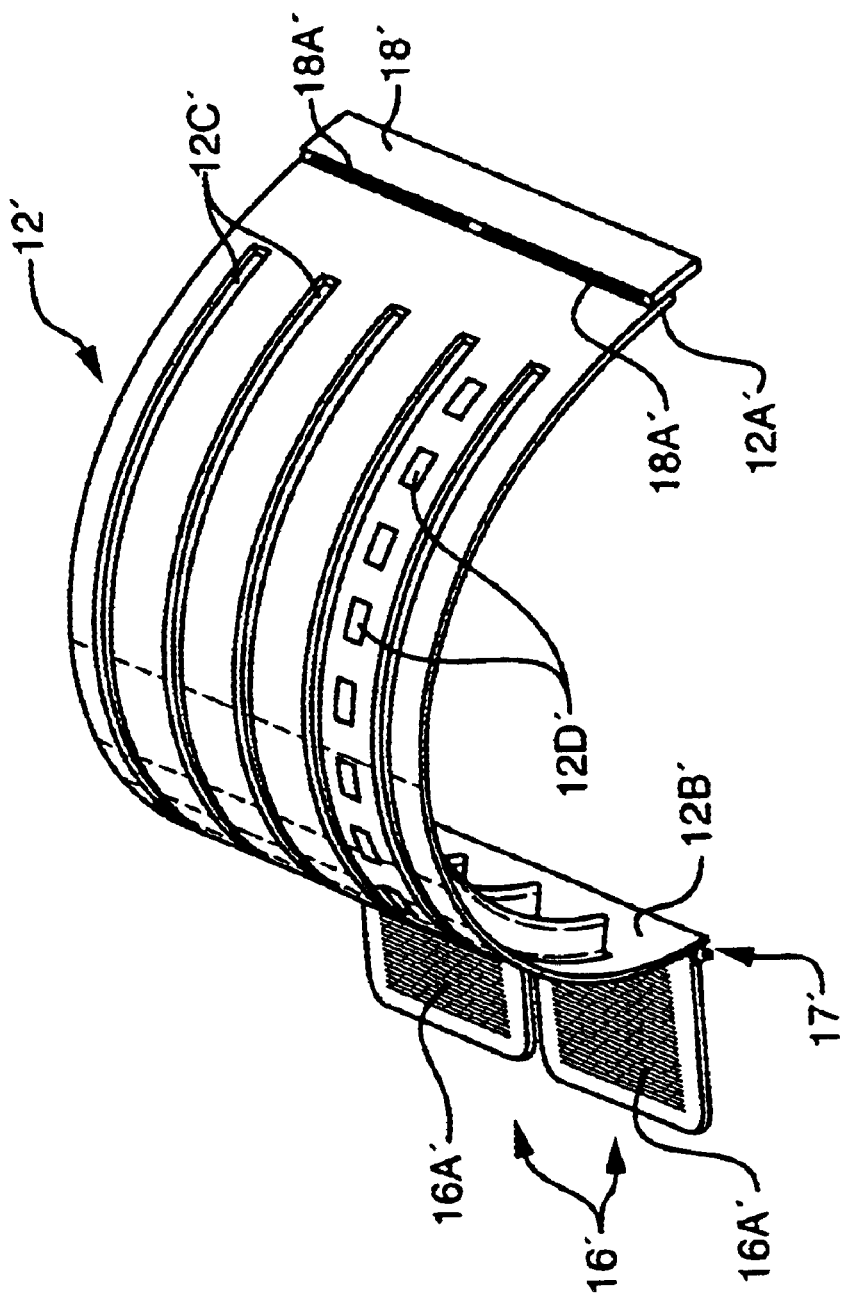
FIG. 8 is a single coupling member having a length, a width and an inner surface, wherein the length of the inner surface is defined by an arc of a number of degrees, which number of degrees is variable and determinable and a function of the conduit diameter which is to be coupled.

A third embodiment of the invention, as shown in FIG. 8, is a single coupling member 12' having a length, a width and an inner surface, wherein the length of the inner surface is defined by an arc of a number of degrees, which number of degrees is variable and determinable and a function of the conduit diameter which is to be coupled. On a first end 12b' of the coupling member 12' is at least a first cooperating attaching component 16' and on the other end 12a' of the coupling member is configured a second cooperating attaching component 18'. First cooperating attaching component 16' may have thereon a plurality of dents, detents, scorings or ridges 16a' for cooperating, in either a permanent or reversible manner with a plurality of cooperating dents, detents, scorings or ridges 18a' in second cooperating attaching component 18'.

Using an appropriate number of the single coupling members 12', conduits of various diameters may be coupled. Where corrugated pipe is being coupled, the inner surface of the single coupling member will have a means for interfitting with at least one of the corrugations of the corrugated conduit. In this example a plurality of corrugations 12c' are shown. The single coupling member 12' of this third embodiment is similar in configuration to coupler 10 but would have a lesser arc length, is not hinged, and has both the first and second cooperating attaching components 16', 18' one on each end. Single coupling member 12' may also have a means 17' for limiting or regulating the degree of bend permitted for the first cooperating attaching component(s) 16'. The means for regulating 17' may be a bump or a ridge which contacts a stopping surface when the first cooperating attaching component 16' is bent past alignment with a tangent to the first end 12b' the coupling member 12'.

As with the first and second embodiments, this third, single coupling member embodiment may include a plurality of perforations 12d' in the wall of the coupling member 12' if perforated conduit is being connected. Perforations may also be included on and in the corrugations 12c' of coupling member 12' if perforated corrugated conduit is being connected.

In a fourth embodiment of the invention there is a coupler for coupling smooth walled conduit. While this embodiment is not specifically shown in a drawing Figure, it may be understood, by one of ordinary skill in the art, from the following description, without the need for specific illustration.

The coupler for coupling smooth walled conduit has either several engaging elements or an engaging ridge protruding inwardly from the inner surface of the hinged first and second coupling members, or single coupling member(s) that form the coupler. The ridge(s) or engaging element(s) engages with an engaging channel appropriately formed on the outer surface of the smooth walled pipe/conduit and appropriately positioned from each end of conduit being joined, which ends will be adjacent to each other, for engaging with the engaging elements or the engaging ridge when coupled or connected.

As with the previous three embodiments there may be a plurality of perforations in the wall of each first and second coupling member, or single coupling member, for use with perforated conduit.

In each of the four preferred embodiments of the invention there may also be a pressure producing element which increases coupling forces when the first and second cooperating attaching components are attached. The pressure producing element may simply be a lip which creates an outwardly directed force as the first and second cooperating attaching components are engaged. Again, while this feature is not shown in the drawing figures, from the foregoing description it would be understood by one of ordinary skill in the art.

It is thought that the present invention, the coupler for coupling conduit, and most particularly for coupling corrugated pipe or the fluid conducting conduit structure for use within a drainage field, and many of its attendant advantages is understood from the foregoing description. It will be apparent that various changes may be made in the form, construction and arrangement of the parts thereof without departing from the spirit and scope of the invention or sacrificing of its material advantages, the form hereinbefore described being merely a preferred or exemplary embodiment.

What is claimed is:

1. A coupler for coupling drainage conduit comprising:
   a first arcuate coupling member and a second arcuate coupling member hingingly attached each to one end of the other at a hinge region, said hinge region having a means for regulating the amount of flex permitted at said hinge region comprising a bump or ridge which contacts a stopping surface to prevent excessive flexing of said hinge region;
   a first cooperating attaching component attached to an outer end of said first arcuate coupling member opposite said hinge region; and
   a second cooperating attaching component attached to an outer end of said second arcuate coupling member opposite said hinge region; and
   wherein said coupler is wrappable around adjacent ends of aligned drainage conduit and said first and said second cooperating attaching components are attachable each to the other, thereby closing said coupler and securing the adjacent ends of aligned drainage conduit together in fluid flow communication.

2. The coupler of claim 1 wherein said first arcuate coupling member comprises:
   at least one corrugation formed in said first arcuate coupling member, said at least one corrugation located and spaced to fit within and mate or interfit with at least one corrugated of corrugated drainage conduit.

3. The coupler of claim 1 wherein said second arcuate coupling member comprises:
   at least one corrugation formed in said second arcuate coupling member, said at least one corrugation located and spaced to fit within and mate or interfit with at least one corrugation of corrugated drainage conduit.

4. The coupler of claim 1 wherein said first cooperating attaching component comprises:
   a plurality of dents, detents, scorings, or ridges located thereon.

5. The coupler of claim 4 wherein said second cooperating attaching component comprises:
   a plurality of dents, detents, scorings, or ridges located thereon which cooperate with said dents, detents, scorings or ridges of said first cooperating attaching component to close and secure said coupler in a closed position.

6. The coupler of claim 5 wherein the geometry of said pluralities of dents, detents, scorings, or ridges of each of said first and said second cooperating attaching components is such that said first and said second cooperating attaching components are irreversibly attachable once attached each to the other such that said coupler is not reusable.

7. The coupler of claim 5 wherein the geometry of said pluralities of dents, detents, scorings, or ridges of each of said first and said second cooperating attaching components is such that said first and said second cooperating attaching components are detachable each from the other such that said coupler is reusable.

8. The coupler of claim 1 wherein the inside diameter of said coupler is about equal to or slightly greater than the outside diameter of drainage conduit being coupled by said coupler.

9. The coupler of claim 1 comprising:
   an elastic material disposed on the interior surface of each said first and said second arcuate coupling members of said coupler, which said elastic material is compressable against the outer surface of drainage conduits being coupled, to enhance the seal made by said coupler.

10. The coupler of claim 1 comprising:
    a means for regulating the amount of flex permitted of said first cooperating attaching component comprising:
    a bump or ridge which contacts a stopping surface if said first cooperating attaching component is bent past alignment with a tangent to said outer end of said first arcuate coupling member.

11. The coupler of claim 1 wherein said first arcuate coupling member comprises:
    a plurality of perforations in the wall of said first arcuate coupling member, wherein said plurality of perforations is located and spaced to mate or interfit with perforations of perforated drainage conduit.

12. The coupler of claim 1 wherein said second arcuate coupling member comprises:
    a plurality of perforations in the said second arcuate coupling member, wherein said plurality of perforations is located and spaced to mate or interfit with perforations of perforated drainage conduit.

13. The coupler of claim 2 further comprising:
    a plurality of perforations in said at least one corrugation, wherein said plurality of perforations is located and spaced to mate or interfit with perforations of perforated drainage conduit.

14. The coupler of claim 3 further comprising:
    a plurality of perforations in said at least one corrugation, wherein said plurality of perforations is located and spaced to mate or interfit with perforations of perforated corrugated drainage conduit.

15. A coupler for coupling corrugated drainage conduit comprising:
    a first arcuate coupling member and a second arcuate coupling member hingingly attached each to one end of the other at a hinge region, said hinge region having a means for regulating the amount of flex permitted at said hinge region comprising a bump or ridge which contacts a stopping surface to prevent excessive flexing of said hinge region;
    a first cooperating attaching component attached to an outer end of said first arcuate coupling member opposite said hinge region; and a second cooperating attaching component attached to an outer end of said second arcuate coupling member opposite said hinge region;

at least one corrugation formed in said first arcuate coupling member, and at least one corrugation formed in said second arcuate coupling member, said at least one corrugation of said first and said second arcuate coupling members located and spaced to fit within and mate or interfit with at least one corrugation of corrugated drainage conduit; and wherein said coupler is wrappable around adjacent ends of aligned drainage conduit and said first and said second cooperating attaching components are attachable each to the other, thereby closing said coupler and securing the adjacent ends of aligned drainage conduit together in fluid flow communication.

16. The coupler of claim 15 wherein said first cooperating attaching component comprises:

a plurality of dents, detents, scorings, or ridges located thereon.

17. The coupler of claim 16 wherein said second cooperating attaching component comprises:

a plurality of dents, detents, scorings, or ridges located thereon which cooperate with said dents, detents, scorings or ridges of said first cooperating attaching component to close and secure said coupler in a closed position.

18. The coupler of claim 17 wherein the geometry of said pluralities of dents, detents, scorings, or ridges of each of said first and said second cooperating attaching components is such that said first and said second cooperating attaching components are irreversibly attachable once attached each to the other such that said coupler is not reusable.

19. The coupler of claim 17 wherein the geometry of said pluralities of dents, detents, scorings, or ridges of each of said first and said second cooperating attaching components is such that said first and said second cooperating attaching components are detachable each from the other such that said coupler is reusable.

20. The coupler of claim 15 wherein the inside diameter of said coupler is about equal to or slightly greater than the outside diameter of drainage conduit being coupled by said coupler.

21. The coupler of claim 15 comprising:

an elastic material disposed on the interior surface of each said first and said second arcuate coupling members of said coupler, which said elastic material is compressable against the outer surface of the drainage conduits being coupled, to enhance the seal made by said coupler.

22. The coupler of claim 15 comprising:

a means for regulating the amount of flex permitted of said first cooperating attaching component comprising:

a bump or ridge which contacts a stopping surface if said first cooperating attaching component is bent past alignment with a tangent to said outer end of said first arcuate coupling member.

23. The coupler of claim 15 comprising:

a plurality of perforations in said at least one corrugation in said first and said second arcuate coupling members wherein said plurality of perforations is located and spaced to mate or interfit with perforations of perforated conduit if perforated corrugated drainage conduit.

* * * * *